(12) United States Patent
Ito et al.

(10) Patent No.: US 11,573,449 B2
(45) Date of Patent: Feb. 7, 2023

(54) DISPLAY DEVICE

(71) Applicant: Japan Display Inc., Tokyo (JP)

(72) Inventors: Tomoyuki Ito, Tokyo (JP); Kazuki Matsunaga, Tokyo (JP); Shigesumi Araki, Tokyo (JP); Kazuhide Mochizuki, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/578,723

(22) Filed: Jan. 19, 2022

(65) Prior Publication Data
US 2022/0229329 A1    Jul. 21, 2022

(30) Foreign Application Priority Data
Jan. 20, 2021   (JP) .............. JP2021-007121

(51) Int. Cl.
*G02F 1/1335* (2006.01)
*G02F 1/1333* (2006.01)
*G06V 40/13* (2022.01)
*G02F 1/1343* (2006.01)

(52) U.S. Cl.
CPC .... *G02F 1/133514* (2013.01); *G02F 1/13338* (2013.01); *G02F 1/13439* (2013.01); *G06V 40/1318* (2022.01)

(58) Field of Classification Search
CPC .......... G02F 1/133514; G02F 1/13338; G02F 1/13439; G06V 40/1318

USPC .......................................................... 349/12
See application file for complete search history.

(56) References Cited

U.S. PATENT DOCUMENTS

| 2003/0174870 | A1 | 9/2003 | Kim et al. |
| 2012/0062817 | A1* | 3/2012 | Kanbayashi ............ G06F 3/042 349/61 |
| 2012/0287085 | A1* | 11/2012 | Yuki .................... G06F 3/04166 345/175 |
| 2016/0103359 | A1* | 4/2016 | Kimura ............. G02F 1/133512 349/33 |
| 2016/0266695 | A1* | 9/2016 | Bae .................... G06V 40/1318 |
| 2018/0165497 | A1 | 6/2018 | Lee et al. |

FOREIGN PATENT DOCUMENTS

| JP | 3840595 B2 | 11/2006 |
| JP | 6479151 B2 | 3/2019 |

* cited by examiner

*Primary Examiner* — Charles S Chang
(74) *Attorney, Agent, or Firm* — Maier & Maier, PLLC

(57) ABSTRACT

According to one embodiment, a display device comprises a collimating layer including first to third openings, first to third color filters overlaid on the first to third openings, respectively, a first sensor outputting a first detection signal corresponding to light made incident through the first opening and the first color filter, a second sensor outputting a second detection signal corresponding to light made incident through the second opening and the second color filter, and a third sensor outputting a third detection signal corresponding to light made incident through the third opening and the third color filter.

19 Claims, 13 Drawing Sheets

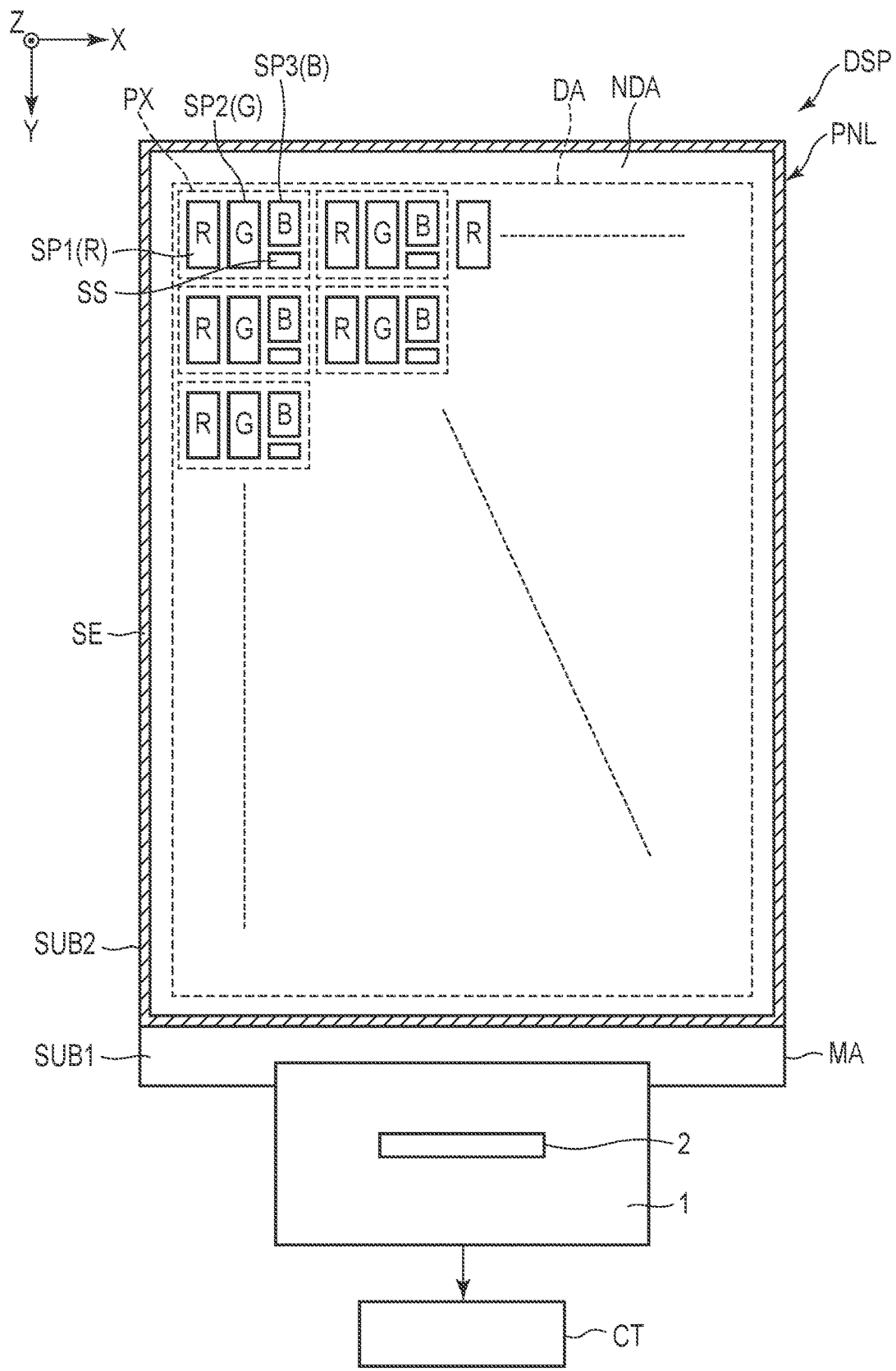
F I G. 2

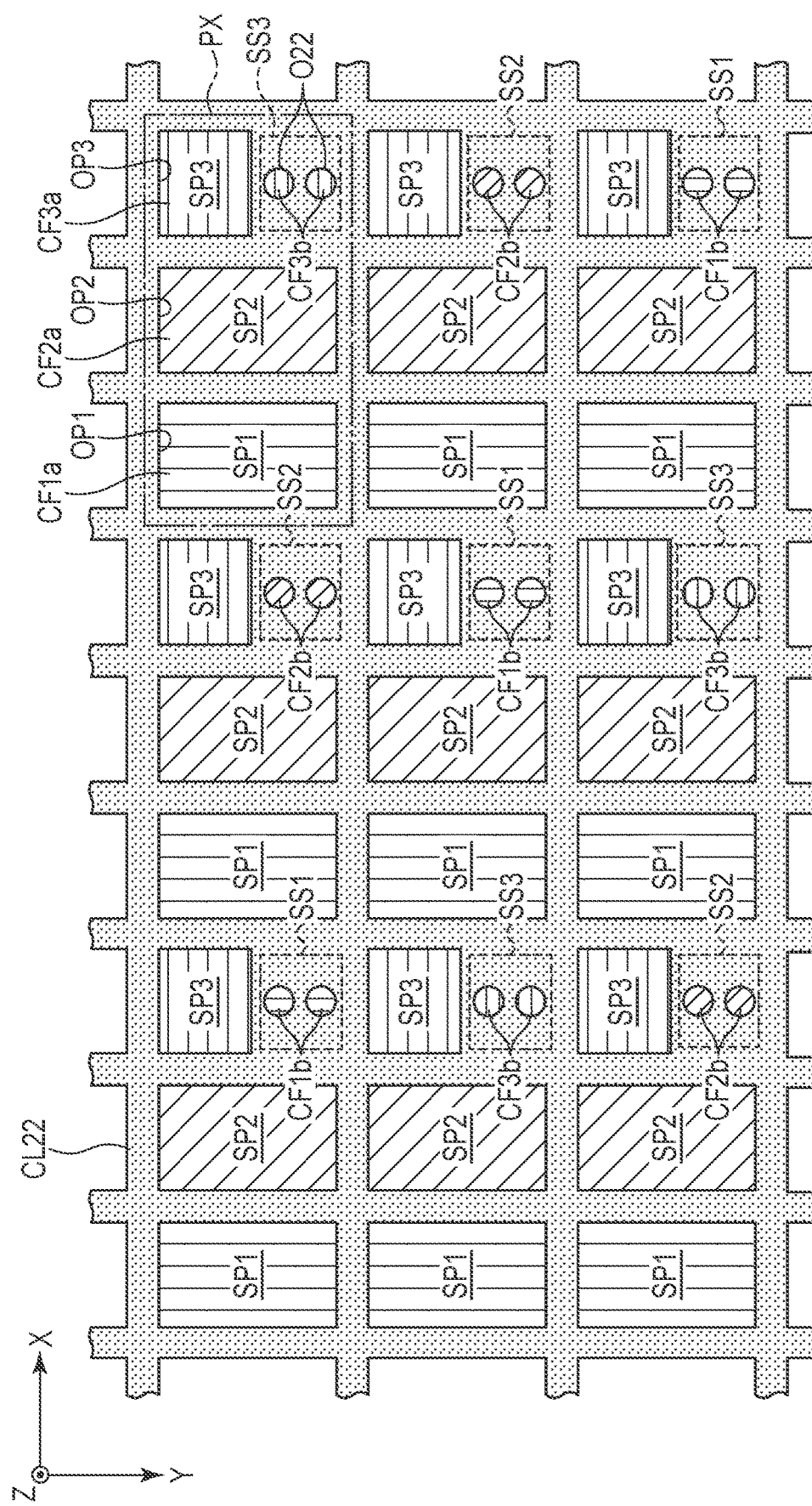
F I G. 3

DISPLAY DEVICE

CROSS-REFERENCE TO RELATED APPLICATIONS

This application is based upon and claims the benefit of priority from Japanese Patent Application No. 2021-007121, filed Jan. 20, 2021, the entire contents of which are incorporated herein by reference.

FIELD

Embodiments described herein relate generally to a display device.

BACKGROUND

In recent years, display devices with built-in sensors for detecting biometric information, such as fingerprint sensors and vein sensors, have been developed. For example, an optical sensor using a photoelectric conversion element is used as this type of sensor.

For example, in the case of detecting a fingerprint by an optical sensor, even when a simulated body having unevenness similar to that of a fingerprint is held over the sensor the body can be detected similarly to a fingerprint of a user's finger (living body). Therefore, it is desired to be able to discriminate whether an object to be detected by the sensor is a living body or a simulated body.

BRIEF DESCRIPTION OF THE DRAWINGS

FIG. 2 is a plan view schematically showing the display device according to the first embodiment.

FIG. 3 is a schematic plan view showing an example of a layout of pixels according to the first embodiment.

DETAILED DESCRIPTION

Figure 1:
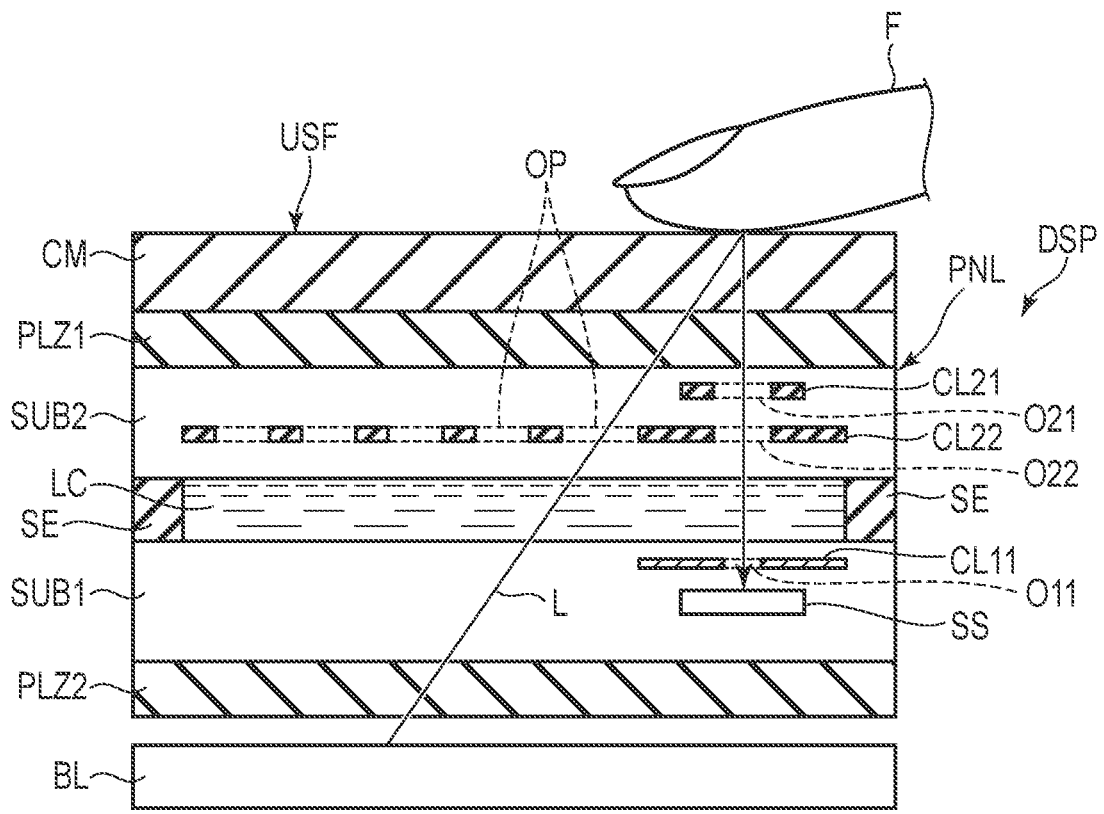
FIG. 1 is a schematic view showing a display device according to a first embodiment.

In general, according to one embodiment, a display device comprises a collimating layer including a first opening, a second opening, and a third opening; a first color filter of a first color overlaid on the first opening; a second color filter of a second color overlaid on the second opening; a third color filter of a third color overlaid on the third opening; a first sensor disposed in a display area including a pixel, and outputting a first detection signal corresponding to light made incident through the first opening and the first color filter; a second sensor disposed in the display area, and outputting a second detection signal corresponding to light made incident through the second opening and the second color filter; and a third sensor disposed in the display area, and outputting a third detection signal corresponding to light made incident through the third opening and the third color filter.

According to another embodiment, a display device comprises a sensor disposed in a display area including a pixel, and outputting a detection signal corresponding to reflected light emitted from the pixel and reflected on an object; and a driver controlling the pixel and the sensor. The pixel includes a first sub-pixel emitting light of a first color, a second sub-pixel emitting light of a second color, and a third sub-pixel emitting light of a third color. The driver is configured to turn on the first sub-pixel during a first period and causing the sensor to output a first detection signal corresponding to reflected light of the light of the first color emitted from the first sub-pixel, to turn on the second sub-pixel during a second period and causing the sensor to output a second detection signal corresponding to reflected light of the light of the second color emitted from the second sub-pixel, and to turn on the third sub-pixel during a third period and causing the sensor to output a third detection signal corresponding to reflected light of the light of the third color emitted from the third sub-pixel.

According to these configurations, a display device capable of discriminating whether an object detected by a sensor is a living body or a simulated body can be obtained.

Various embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restrictions to the interpretation of the invention. In the drawings, reference numbers of contiguously arranged elements equivalent or similar to each other are omitted in some cases. Besides, in the specification and drawings, structural elements performing the functions that are the same as or similar to those described above in connection with preceding drawings are denoted by like reference numerals, detailed description thereof being omitted unless necessary.

In each of the embodiments, a liquid crystal display device comprising a transmissive liquid crystal display element will be described as an example of the display device. However, each of the embodiment does not prevent application of individual technical ideas disclosed in each embodiment to the other types of display devices. For example, a display device comprising a self-luminous display element such as an organic electroluminescent display element or an LED display element is assumed as the other type of display device. In addition, the configuration related to the sensor disclosed in each of the embodiments can also be applied to various detection devices that do not have a display function.

First Embodiment

FIG. 1 is a diagram schematically showing a liquid crystal display device DSP (hereinafter referred to as a display device DSP) according to a first embodiment. The display device DSP comprises a display panel PNL, a cover member CM, a first polarizer PLZ1, a second polarizer PLZ2, and an illumination device BL.

The display panel PNL is a transmissive liquid crystal panel, and comprises a first substrate SUB1, a second substrate SUB2 opposed to the first substrate SUB1, a sealing material SE, and a liquid crystal layer LC. The liquid crystal layer LC is disposed between the first substrate SUB1 and the second substrate SUB2 by the sealing material SE. The display panel PNL of the present embodiment displays an image by selectively transmitting light from a back surface side of the first substrate SUB1 to an upper surface side of the second substrate SUB2.

The first substrate SUB1 comprises a sensor SS and a collimating layer CL11. The collimating layer CL11 is located between the sensor SS and the liquid crystal layer LC. In the present embodiment, the collimating layer CL11 is formed of a metal material and has light-shielding properties. For this reason, the collimating layer CL11 can be referred to as a metal layer or a light-shielding layer.

The second substrate SUB2 comprises collimating layers CL21 and CL22. The collimating layer CL22 is located closer to the liquid crystal layer LC side than to the collimating layer CL21. The collimating layers CL21 and CL22 are formed of, for example, black resin and have light-shielding properties. The collimating layers CL21 and CL22 can be referred to as light-shielding layers.

The collimating layer CL11 includes an opening O11 overlaid on the sensor SS. The collimating layer CL21 includes an opening O21 overlaid on the sensor SS, and the collimating layer CL22 has an opening O22 overlaid on the sensor SS. In addition, the collimating layer CL22 includes a pixel opening OP at a position that is not overlaid on the sensor SS. The openings O11, O21, and O22 are overlaid on each other. For example, the opening O11 is smaller than the openings O21 and O22, and the openings O21 has the same size as the opening O22.

The sealing material SE bonds the first substrate SUB1 and the second substrate SUB2. A predetermined cell gap is formed between the first substrate SUB1 and the second substrate SUB2 by a spacer (not shown). The liquid crystal layer LC is buried in this cell gap.

The cover member CM is provided on the display panel PNL. For example, a glass substrate or a resin substrate can be used as the cover member CM. The cover member CM has an upper surface USF which an object to be detected by the sensor SS contacts. In the example of FIG. 1, a finger F which is an example of the object is in contact with the upper surface USF. The first polarizer PLZ1 is provided between the display panel PNL and the cover member CM.

The illumination device BL is provided under the display panel PNL and irradiates light L onto the first substrate SUB1. The illumination device BL is, for example, a side-edge type backlight and comprises a plate-shaped light guide and a plurality of light sources that emit light to a side surface of the light guide. The second polarizer PLZ2 is provided between the display panel PNL and the illumination device BL.

Reflected light reflected by the finger F out of the light L enters the sensor SS through the openings O21, O22, and O11 in order. That is, the reflected light reflected by the finger F is transmitted through the cover member CM, the first polarizer PLZ1, the second substrate SUB2, the liquid crystal layer LC, and a portion of the first substrate SUB1 that is located on an upper side than the sensor SS, before entering the sensor SS.

The sensor SS outputs a detection signal corresponding to the incident light. As described below, the display panel PNL comprises a plurality of sensors SS, and unevenness (for example, a fingerprint) on the surface of a finger F can be detected based on the detection signals output by the sensors SS.

The sensor SS desirably detects the incident light parallel to the normal of the upper surface USF in order to obtain a more accurate detection signal. The collimating layers CL11, CL21, and CL22 function as collimators to parallelize the light incident on the sensor SS. In other words, light that is inclined to the normal of the upper surface USF is blocked by the collimating layers CL11, CL21, and CL22.

A function serving as a fingerprint sensor can be added to the display device DSP by thus mounting the sensor SS on the display device DSP. In addition, the sensor SS can also be used for the purpose of detecting information on a living body, based on the light reflected inside the finger F, in addition to or instead of detection of fingerprints. The information on the living body is, for example, images of blood vessels such as veins, a pulse, a pulse wave, and the like.

FIG. 2 is a plan view schematically showing the display device DSP according to the present embodiment. A first direction X, a second direction Y and a third direction Z are defined as shown in FIG. 2. For example, the first direction X, the second direction Y, and the third direction Z are orthogonal to each other, but may intersect at an angle other than 90 degrees. The first direction X and the second direction Y correspond to the directions parallel to the main surface of each substrate included in the display device DSP, and the third direction Z corresponds to the thickness direction of the display device DSP. In this specification, the direction toward a tip of an arrow indicating the third direction Z is referred to as up/upward, and the opposite direction is often referred to as down/downward. In addition, viewing the display device DSP and its components parallel to the third direction Z is referred to as planar view.

The display device DSP comprises a display panel PNL described above, and a wiring substrate 1 mounted on the display panel PNL. The display panel PNL includes a display area DA in which an image is displayed, and a non-display area NDA (peripheral area) surrounding the display area DA.

The first substrate SUB1 includes a mounting area MA that is not overlaid on the second substrate SUB2. The sealing material SE is located in the non-display area NDA. In FIG. 2, the area in which the sealing material SE is disposed is represented by hatch lines. The display area DA is located inside the sealing material SE. The display panel PNL comprises pixels PX arrayed in a matrix in the first direction X and the second direction Y, in the display area DA.

Each of the pixels PX includes a sub-pixel SP1 that emits red (R) light, a sub-pixel SP2 that emits green (G) light, and a sub-pixel SP3 that emits blue (B) light. The pixel PX may also include a sub-pixel emitting light of a color other than red, green and blue.

In the example of FIG. 2, one sensor SS is disposed for each pixel PX. In the entire display area DA, the sensors SS are arrayed in a matrix in the first direction X and the second direction Y.

The sensors SS do not need to be disposed for all the pixels PX. For example, the sensors SS may be disposed at one ratio for the pixels PX. In addition, the sensors SS may be disposed for the pixels PX in several areas in the display area DA and may not be disposed for the pixels PX in other areas.

The wiring substrate 1 is, for example, a flexible circuit board and is connected to terminal portions provided in the mounting area MA. In addition, the wiring substrate 1 is provided with a driver 2 that drives the display panel PNL. The driver 2 may be mounted at the other position such as the mounting area MA. For example, the driver 2 includes an IC that controls the display operation executed by each pixel PX and an IC that controls the detection operations executed by the sensors SS. These ICs may be mounted at different positions. The detection signals output by the sensors SS are output to the controller CT via the wiring substrate 1 and the driver 2. The controller CT executes calculation processing for detecting a fingerprint, and the like.

FIG. 3 is a schematic plan view showing an example of the layout of the pixels PX. The above-described collimating layer CL22 includes a pixel opening OP1 in a sub-pixel SP1, a pixel opening OP2 in a sub-pixel SP2, and a pixel opening OP3 in a sub-pixel SP3. The pixel openings OP1, OP2, and OP3 are examples of the pixel openings OP shown in FIG. 1.

Furthermore, the collimating layer CL22 includes two openings O22 overlaid on the sensor SS in each pixel PX. These two openings O22 are arranged in the second direction Y. The number of openings O22 overlaid on one sensor SS is not limited to two, but may be one or may be three or more. The openings O22 overlaid on one sensor SS do not need to be necessarily aligned in the second direction Y and can be disposed in various aspects.

For example, the opening O22 has a circular shape as shown in the figure. However, the shape of the opening O22 is not limited thereto, and may be any other shape such as a rectangle. The openings O11 and O21 shown in FIG. 1 have the same shape as the opening O22.

The collimating layer CL22 is disposed at the boundaries of the sub-pixels SP1, SP2, and SP3, and is entirely in the grating shape. Such a collimating layer CL22 may be referred to as a black matrix.

In the example of FIG. 3, the pixel openings OP1, OP2, and OP3 are aligned in this order in the first direction X. The width of the pixel opening OP3 in the second direction Y is smaller than the widths of the pixel openings OP1 and OP2 in the second direction Y. Openings O22 are disposed in space thereby created. The openings O22 are aligned with the pixel opening OP2 in the first direction X and aligned with the pixel opening OP3 in the second direction Y.

A red color filter CF1a is disposed in the sub-pixel SP1, a green color filter CF2a is disposed in the sub-pixel SP2, and a blue color filter CF3a is disposed in the sub-pixel SP3. The color filters CF1a, CF2a, and CF3a are overlaid on the pixel openings OP1, OP2, and OP3, respectively.

Furthermore, the openings O22 and the sensor SS are overlaid on any of a red color filter CF1b, a green color filter CF2b, and a blue color filter CF3b. In the following description, the sensor SS overlaid on the color filter CF1b is referred to as a sensor SS1, the sensor SS overlaid on the color filter CF2b is referred to as a sensor SS2, and the sensor SS overlaid on the color filter CF3b is referred to as a sensor SS3.

In the example of FIG. 3, the sensor SS1, the sensor SS2, and the sensor SS3 are aligned in this order in the first direction X. In addition, the sensor SS1, the sensor SS3, and the sensor SS2 are aligned in this order in the second direction Y. The sensors SS1, SS2, and SS3 are thereby distributed in both the first direction X and the second direction Y.

Figure 4:
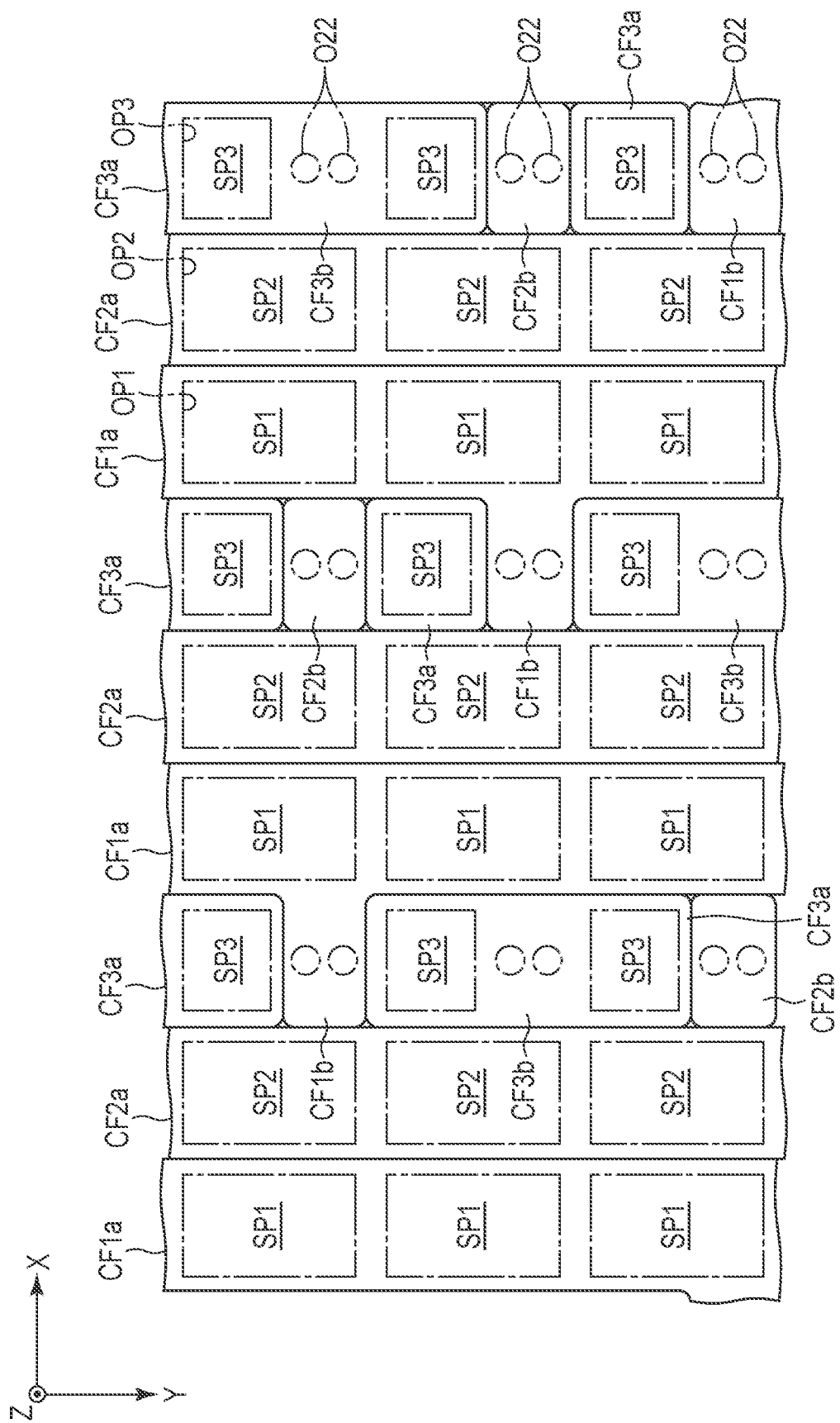
FIG. 4 is a schematic plan view showing an example of a shape of a color filter according to the first embodiment.

FIG. 4 is a schematic plan view showing an example of the shapes of the color filters CF1a, CF2a, CF3a, CF1b, CF2b, and CF3b. In FIG. 4, the pixel openings OP1, OP2, and OP3 and opening O22 are also shown with chain lines.

The color filter CF1a is formed in a straight line over a plurality of pixel openings OP1 aligned in the second direction Y. The color filter CF2a is formed in a straight line over a plurality of pixel openings OP2 aligned in the second direction Y. The color filters CF3a are formed intermittently in the second direction Y. Some of the color filters CF3a are overlaid on two pixel openings OP3, while the other color filters CF3a are overlaid on only one pixel opening OP3.

The color filter CF1b is disposed between the two color filters CF3a aligned in the second direction Y. In the present embodiment, the color filters CF1a and CF1b are formed of the same material. The color filter CF1b is integrally connected to the adjacent color filter CF1a.

The color filter CF2b is disposed in an island shape in an area surrounded by the color filters CF1a and CF2a aligned in the first direction X and the two color filters CF3a aligned in the second direction Y. In the present embodiment, the color filters CF2a and CF2b are formed of different materials. For example, the color filter CF2b is formed of a material having a lower transmittance of infrared rays (i.e., a material having a higher absorption index or reflectance of infrared rays) than the color filter CF2a. In this case, the color filter CF2b may be referred to as an infrared cut layer.

In the present embodiment, the color filters CF3a and CF3b are formed of the same material. The color filter CF3b is integrally connected to two color filters CF3a adjacent in the second direction Y. In other words, a blue color filter which is large enough to be overlaid on the two pixel openings OP3 adjacent in the second direction Y and the two openings O22 disposed therebetween is disposed in the display area DA and, in this color filter, a portion overlaid on the pixel opening OP3 corresponds to the color filter CF3a and a portion overlaid on the openings O22 corresponds to the color filter CF3b.

Figure 5:
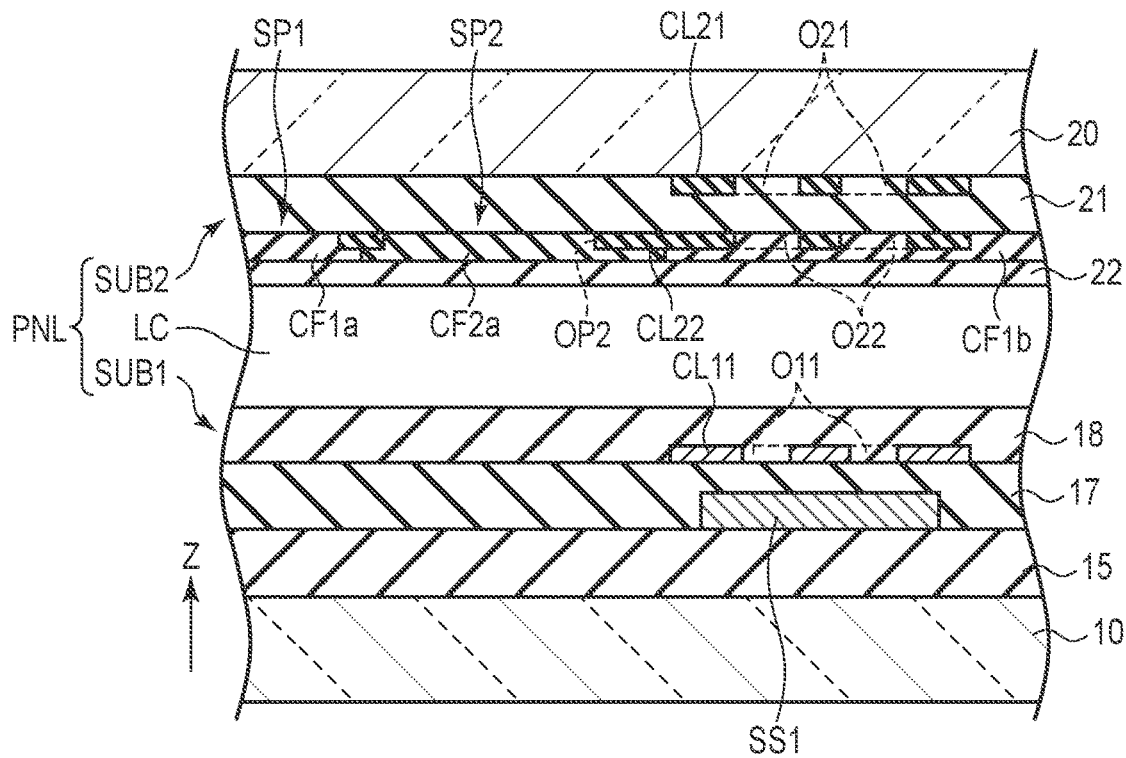
FIG. 5 is a schematic cross-sectional view showing a display panel according to the first embodiment.

FIG. 5 is a schematically cross-sectional view showing the display panel PNL. The cross-sectional structure including the sub-pixels SP1 and SP2 and the sensor SS1 is shown in this figure. The cross-sectional structure including the sensors SS2 and SS3 is also the same as the cross-sectional structure including the sensor SS1.

In addition to the sensors SS1, SS2, and SS3 and the collimating layer CL11, the first substrate SUB1 comprises a transparent first base material 10 and insulating layers 15, 17, and 18.

The first base material 10 is, for example, a glass substrate or a resin substrate. The insulating layers 15, 17, and 18 are formed of, for example, an organic material and are stacked in order on the first base material 10. The sensor SS1 is located between the insulating layers 15 and 17. The collimating layer CL11 is located between the insulating layers 17 and 18. The collimating layer CL11 is overlaid on the entire sensor SS1 in the third direction Z, except for a portion of the opening O11.

The second substrate SUB2 comprises a transparent second base material 20, an insulating layer 21, and an overcoat layer 22 in addition to the collimating layers CL21 and CL22 and the color filters CF1a, CF2a, CF3a, CF1b, CF2b, and CF3b described above.

The second base material 20 is, for example, a glass substrate or a resin substrate, similarly to the first base material 10. The insulating layer 21 and the overcoat layer 22 are formed of, for example, an organic material, and are stacked in order under the second base material 20. The insulating layer 21 may have a structure in which a layer formed of an organic material and a layer formed of an inorganic material are stacked. The collimating layer CL21 is located between the second base material 20 and the insulating layer 21. The collimating layer CL22 and the color filters CF1a, CF2a, CF3a, CF1b, CF2b, and CF3b are located between the insulating layer 21 and the overcoat layer 22.

Figure 6:
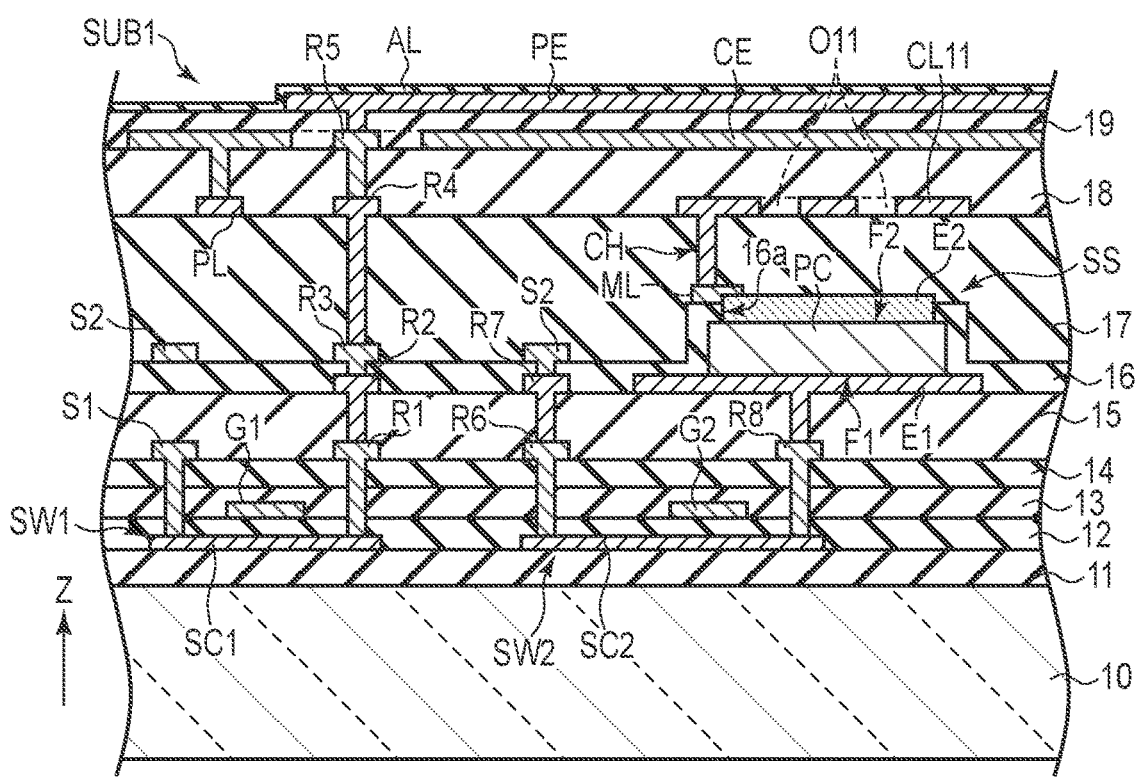
FIG. 6 is a schematic cross-sectional view showing an example of a structure that can be applied to a first substrate according to the first embodiment.
Figure 7:
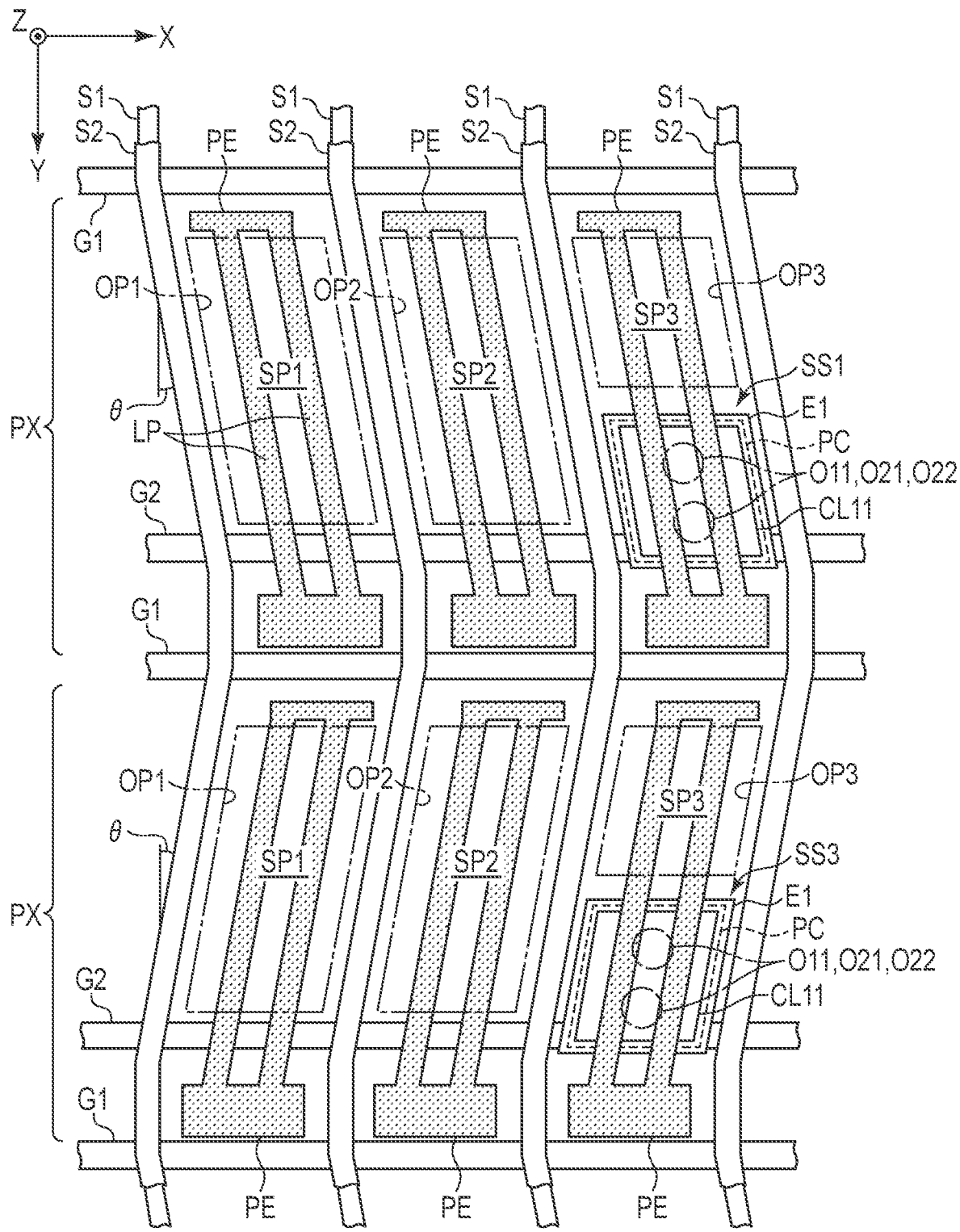
FIG. 7 is a schematic plan view showing elements disposed on the first substrate according to the first embodiment.

The structure that can be applied to the first substrate SUB1 will be described in more detail with reference to FIG. 6 and FIG. 7. FIG. 6 and FIG. 7 schematically show the structure of the first substrate SUB1 in a cross-sectional view and a plan view, respectively, and the positional relationships and shapes of respective elements are not necessarily the same in the figures.

FIG. 6 is a schematic cross-sectional view showing an example of a structure that can be applied to the first substrate SUB1. In addition to the insulating layers 15, 17, and 18 shown in FIG. 5, the first substrate SUB1 comprises insulating layers 11, 12, 13, 14, 16, and 19 formed of inorganic materials and an alignment film AL. The insulating layers 11, 12, 13, 14, 15, 16, 17, 18, and 19 and the alignment film AL are stacked in this order in the third direction Z above the first substrate 10.

The first substrate SUB1 comprises a signal line S1, a scanning line G1, a switching element SW1, a pixel electrode PE, a common electrode CE, relay electrodes R1, R2, R3, R4, and R5, and a power supply line PL, as elements related to image display. The pixel electrode PE and the switching element SW1 are provided for each of the sub-pixels SP1, SP2, and SP3. The common electrode CE is provided over, for example, a plurality of sub-pixels SP1, SP2, and SP3.

The switching element SW1 includes a semiconductor layer SC1. The semiconductor layer SC1 is disposed between the insulating layers 11 and 12. The scanning line G1 is disposed between the insulating layers 12 and 13 and is opposed to the semiconductor layer SC1. The signal line S1 is disposed between the insulating layers 14 and 15 and is in contact with the semiconductor layer SC1 through a contact hole penetrating the insulating layers 12, 13, and 14.

The relay electrode R1 is disposed between the insulating layers 14 and 15 and in contact with the semiconductor layer SC1 through a contact hole penetrating the insulating layers 12, 13, and 14. The relay electrode R2 is disposed between the insulating layers 15 and 16 and is contact with the relay electrode R1 through a contact hole penetrating the insulating layer 15. The relay electrode R3 is disposed between the insulating layers 16 and 17 and is in contact with the relay electrode R2 through a contact hole penetrating the insulating layer 16. The relay electrode R4 is disposed between the insulating layers 17 and 18 and is in contact with the relay electrode R3 through a contact hole penetrating the insulating layer 17. The relay electrode R5 is disposed between the insulating layers 18 and 19 and is in contact with the relay electrode R4 through a contact hole penetrating the insulating layer 18.

The pixel electrode PE is disposed between the insulating layer 19 and the alignment film AL and is in contact with the relay electrode R5 through a contact hole penetrating the insulating layer 19. The power supply line PL is disposed between the insulating layers 17 and 18. The common electrode CE is disposed between the insulating layers 18 and 19 and is in contact with the power supply line PL through a contact hole penetrating the insulating layer 18.

A common voltage is supplied to the power supply line PL. This common voltage is applied to the common electrode CE. A video signal is supplied to the signal line S1 and a scanning signal is supplied to the scanning line G1. When the scanning signal is supplied to the scanning line G1, the video signal of the signal line S1 is applied to the pixel electrode PE through the semiconductor layer SC1 and the relay electrodes R1, R2, R3, R4, and R5. At this time, an electric field caused by a potential difference between the common voltage and the video signal is generated between the pixel electrode PE and the common electrode CE, and this electric field acts on the liquid crystal layer LC.

The first substrate SUB1 comprises a signal line S2, a scanning line G2, a switching element SW2, relay electrodes R6, R7, and R8, and a metal layer ML, in addition to the above-described collimating layer CL11, as elements related to the sensor SS (SS1, SS2, and SS3). In addition, the sensor SS comprises a first electrode E1 (lower electrode), a second electrode E2 (upper electrode), and a photoelectric conversion element PC.

The switching element SW2 includes a semiconductor layer SC2. The semiconductor layer SC2 is disposed between the insulating layers 11 and 12. The scanning line G2 is disposed between the insulating layers 12 and 13 and is opposed to the semiconductor layer SC2.

The relay electrode R6 is disposed between the insulating layers 14 and 15 and is in contact with the semiconductor layer SC2 through a contact hole penetrating the insulating layers 12, 13, and 14. The relay electrode R7 is disposed between the insulating layers 15 and 16 and is in contact with the relay electrode R6 through a contact hole penetrating the insulating layer 15. The signal line S2 is disposed between the insulating layers 16 and 17 and is in contact with the relay electrode R7 through a contact hole penetrating the insulating layer 16. The relay electrode R8 is disposed between the insulating layers 14 and 15 and is in contact with the semiconductor layer SC2 through a contact hole penetrating the insulating layers 12, 13, and 14.

The photoelectric conversion element PC has a first surface F1 opposed to the first base material 10 and a second surface F2 opposed to the liquid crystal layer LC. The photoelectric conversion element PC is located between the insulating layers 15 and 16. The first electrode E1 is disposed between the photoelectric conversion element PC and the insulating layer 15 and is in contact with the first surface F1. The first electrode E1 is in contact with the relay electrode R8 through a contact hole that penetrates the insulating layer 15 below the photoelectric conversion element PC.

The insulating layer 16 includes an opening 16a above the photoelectric conversion element PC. The second electrode E2 is disposed between the photoelectric conversion element PC and the insulating layer 17 and is in contact with the second surface F2 through the opening 16a. A part of the second electrode E2 is located between the insulating layers 16 and 17.

The metal layer ML is located between the insulating layers 16 and 17 above the photoelectric conversion element PC. The metal layer ML is in contact with a part of the first electrode E1 which is positioned between the insulating layers 16 and 17.

The collimating layer CL11 is disposed between the insulating layers 17 and 18. In the example of FIG. 6, the collimating layer CL11 is in contact with the metal layer ML through a contact hole CH that penetrates the insulating layer 17. That is, the collimating layer CL11 is electrically connected to the second electrode E2. As a result, no potential difference is formed between the collimating layer CL11, the metal layer ML, and the second electrode E2, and noise caused by the potential difference can be suppressed from being mixed into the signal output by the sensor SS.

The signal line S1 and the relay electrodes R1, R6, and R8 are formed of the same metal material. The scanning lines G1 and G2 are formed of the same metal material. The first electrode E1 and the relay electrodes R2 and R7 are formed of the same metal material. The signal line S2, the metal layer ML, and the relay electrode R3 are formed of the same metal material. The collimating layer CL11, the power supply line PL, and the relay electrode R4 are formed of the same metal material. The second electrode E2, the pixel electrode PE, and the common electrode CE are formed of a transparent conductive material such as indium tin oxide (ITO).

The first electrode E1 formed of a metallic material also functions as a light-shielding layer and suppresses the incidence of light from below to the photoelectric conversion element PC. The photoelectric conversion element PC is, for example, a photodiode and outputs an electric signal corresponding to the incident light. More specifically, a positive intrinsic negative (PIN) photodiode can be used as the photoelectric conversion element PC. This type of photodiode includes a p-type semiconductor layer, an i-type semiconductor layer, and an n-type semiconductor layer. The p-type semiconductor layer is located on the second electrode E2 side, the n-type semiconductor layer is located on the first electrode E1 side, and the i-type semiconductor layer is located between the p-type semiconductor layer and the n-type semiconductor layer.

The p-type semiconductor layer, the i-type semiconductor layer and the n-type semiconductor layer are formed of, for example, amorphous silicon (a-Si). The materials of the semiconductor layers are not limited thereto, and the amorphous silicon may be replaced with polycrystalline silicon, microcrystalline silicon, or the like, and the polycrystalline silicon may be replaced with amorphous silicon, microcrystalline silicon, or the like.

A scanning signal is supplied to the scanning line G2 at the timing at which detection is to be performed by the sensor SS. When the scanning signal is supplied to the scanning line G2, the signal generated at the photoelectric conversion element PC is output to the signal line S2 through the first electrode E1, the relay electrode R8, the semiconductor layer SC2, and the relay electrodes R6 and R7. The signal output to the signal line S2 is, for example, output to the controller CT via the driver 2.

FIG. 7 is a schematic plan view showing the elements disposed on the first substrate SUB1. The configuration of two pixels PX arranged in the second direction Y is shown. Sensors SS1 and SS3 are disposed in each of the pixels PX. Elements other than the scanning lines G1 and G2, the signal lines S1 and S2, the pixel electrodes PE, the collimating layer CL11, the first electrode E1, and the photoelectric conversion element PC are omitted. In the example of FIG. 7, the sub-pixels SP1, SP2, and SP3 are inclined with respect to the second direction Y. The sub-pixels SP1, SP2, and SP3 may not be inclined with respect to the second direction Y, similarly to the examples shown in FIG. 3 and FIG. 4.

Each of the scanning lines G1 is disposed between the pixels PX disposed in the second direction Y. The signal lines S1 are disposed between the sub-pixels SP1, SP2, and SP3 disposed in the first direction X, respectively. The scanning lines G1 extend in the first direction X. The signal lines S1 extend in the second direction Y while being bent.

The pixel electrodes PE of the sub-pixels SP1, SP2, and SP3 included in a single pixel PX have the same shape. Each of the pixel electrodes PE is disposed in an area surrounded by two scanning lines G1 and two signal lines S1. In the example of FIG. 7, the pixel electrodes PE include two line portions LP arranged in the first direction X. The above-described pixel openings OP1, OP2, and OP3 are overlaid on the line portions LP of the pixel electrodes PE of the sub-pixels SP1, SP2, and SP3, respectively.

The scanning line G2 extends in the first direction X between two scanning lines G1 adjacent in the second direction Y. The scanning line G2 is not overlaid on the pixel openings OP1, OP2, and OP3. That is, the scanning line G2 is overlaid on the collimating layer CL11. Similarly to the signal lines S1, the signal lines S2 are disposed between the sub-pixels SP1, SP2, and SP3 disposed in the first direction X, respectively. In the example of FIG. 7, the signal lines S1 and S2 are overlaid.

The collimating layer CL11, the first electrode E1, and the photoelectric conversion element PC are disposed in the area surrounded by the two scanning lines G1 and the two signal lines S1. The collimating layer CL11, the first electrode E1, and the photoelectric conversion element PC are located between the pixel openings OP3 and the scanning lines G1 in the second direction Y and are overlaid on the scanning line G2. The collimating layer CL11, the first electrode E1, and the photoelectric conversion element PC are also overlaid on the line portion LP of the pixel electrode PE of the sub-pixel SP3. The openings O11, O21, and O22 are overlaid on the photoelectric conversion element PC and are also partially overlaid on the line portion LP.

In the upper pixel PX, the signal lines S1 and S2, the line portion LP, the collimating layer CL11, the first electrode E1, and the photoelectric conversion element PC are inclined so as to form an angle θ counterclockwise to the second direction Y. In addition, in the lower pixel PX, the signal lines S1 and S2, the line portion LP, the collimating layer CL11, the first electrode E1, and the photoelectric conversion element PC are inclined so as to form an angle θ clockwise to the second direction Y. This allows a pseudo multi-domain structure to be realized in the upper and lower pixels PX.

Figure 8:
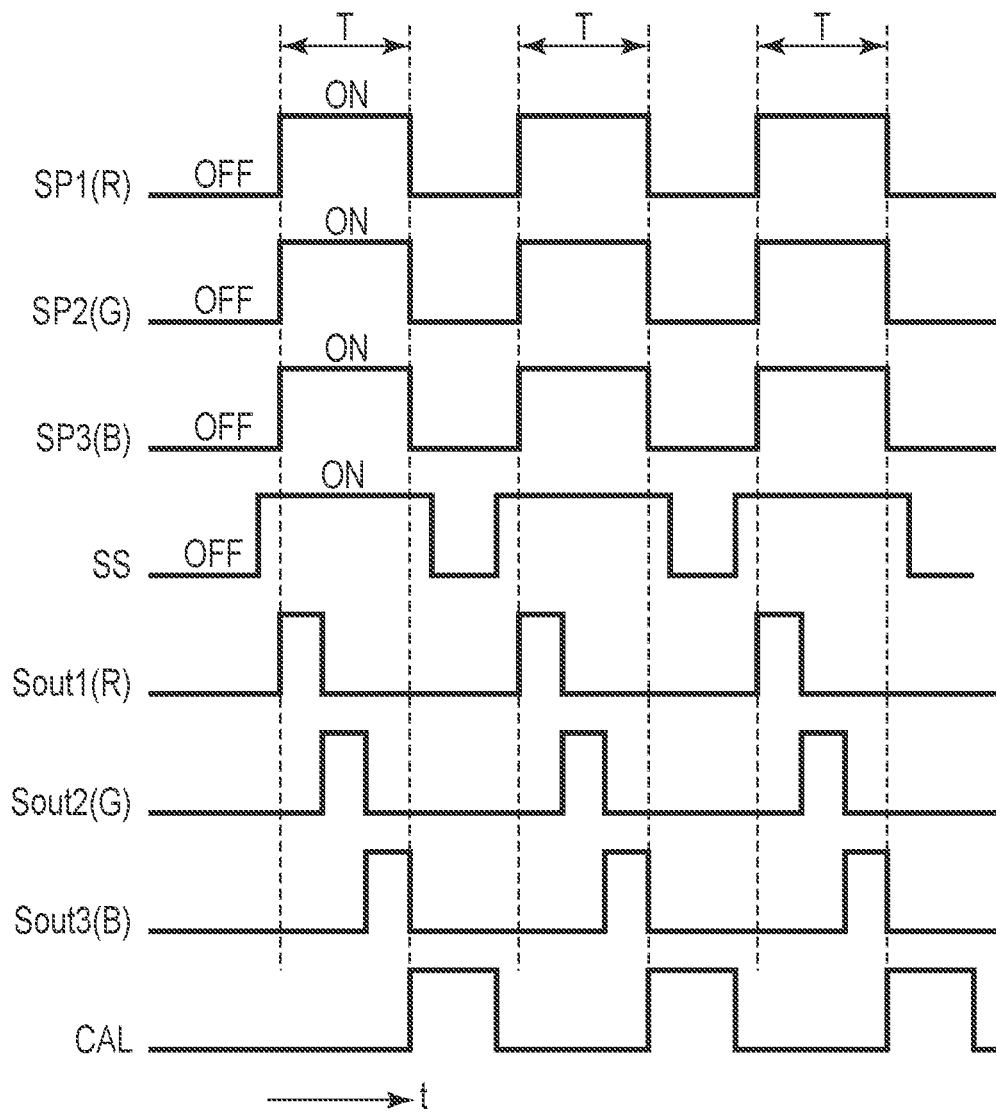
FIG. 8 is a timing chart showing an example of a detection operation according to the first embodiment.

FIG. 8 is a timing chart showing an example of a detection operation using a plurality of sensors SS. In the detection operation, the detection period T arrives repeatedly. In each detection period T, the driver 2 turns on the sub-pixels SP1, SP2, and SP3 of each pixel PX in which the sensor SS (SS1, SS2, and SS3) is located (ON). As a result, white light in which red, green and blue light beams are mixed is applied to an object which contacts or approaches the upper surface USF of the cover member CM. The gradation value (luminance) of the sub-pixels SP1, SP2, and SP3 in the detection period T is not particularly limited if white light is obtained, and the gradation value is, for example, the maximum gradation value (maximum luminance).

In addition, the driver 2 sequentially supplies a scanning signal to the switching element SW2 of each sensor SS in the detection period T (ON). The sensor SS1 outputs a detection signal Sout1 corresponding to the light incident through the openings O11, O21, and O23 above the sensor SS1 and the color filter CF1b. The sensor SS2 outputs a detection signal Sout2 corresponding to the light incident through the openings O11, O21, and O23 and the color filter CF2b above the sensor SS2. The sensor SS3 outputs a detection signal Sout3 corresponding to the light incident through the openings O11, O21, the O23 and the color filter CF3b above the sensor SS3. The driver 2 sequentially acquires these detection signals Sout1, Sout2, and Sout3.

In the present embodiment, the colors of the color filters CF1b, CF2b, and CF3b are red, green, and blue, respectively. Therefore, the detection signal Sout1 corresponds to a red component (wavelength range) of the reflected light of the object, the detection signal Sout2 corresponds to a green component of the reflected light of the object, and the detection signal Sout3 corresponds to a blue component of the reflected light of the object.

After the detection period T, the controller CT performs various calculations (CAL), based on the detection signals Sout1, Sout2, and Sout3. For example, the controller CT detects unevenness (fingerprint) on the surface of the object, based on the detection signals Sout1, Sout2, and Sout3.

Furthermore, the controller CT detects chronological changes of the colors on the surface of the object, based on the detection signals Sout1, Sout2 and Sout3 obtained in the plurality of detection periods T. Based on this chronological change, it can be discriminated whether the object is a user's finger (living body) or a simulated body.

In other words, if the object is a finger, the color of the skin surface changes due to the change in pressure when the finger is pressed against the upper surface USF. In contrast, if the object is a simulated body, such a color change hardly occurs. Therefore, for example, the controller CT can determine that the object is a finger when the chronological change is greater than or equal to a predetermined threshold value and that the object is a simulated body when the chronological change is smaller than the threshold value.

As described above in the present embodiment, if the display device DSP comprises the sensors SS (SS1, SS2, and SS3) that detect respective red, green, and blue light, of the reflected light of the object, it can be discriminated whether the object is a living body or a simulated body. Thus, for example, when a fingerprint is detected by the sensor SS, it can be discriminated whether the fingerprint is that of a user's finger or that of a simulated object.

In recent years, fingerprints are often authenticated to unlock electronic devices such as smartphones and to execute various operations of applications. For this reason, if it can be discriminated whether the fingerprint is that of a user's finger or that of a simulated object, the security of the electronic device in which the display device DSP is mounted can be enhanced.

In the present embodiment, the configuration for discriminating whether the object is a living body or a simulated body is realized by the combination of the sensors SS and the color filters. Thus, if color filters which general liquid crystal display devices also comprises are used, a special element for discriminating the object does not need to be provided.

In the example of FIG. 4, the color filter CF1a for the sub-pixel SP1 and the color filter CF1b for the sensor SS1 are formed of the same material and are connected to each other. With this configuration, since the color filters CF1a and CF1b can be formed at the same time, the manufacturing process is simplified as compared with the case where the color filters CF1a and CF1b are formed of different materials. The same advantage can also be obtained for the color filters CF3a and CF3b.

In addition, if the color filter CF2b is formed of a material having a low transmittance of infrared rays as described above, noise caused by infrared rays can be suppressed from mixing into the detection signal of the sensor SS2.

In the example of FIG. 7, the sensors SS and the collimating layers CL11 are overlaid on the pixel electrodes PE. With such a configuration, the structure of the sub-pixel in which the pixel electrodes PE are disposed does not need to be made significantly different from other sub-pixels. When the pixel electrode PE of the sub-pixel SP3 is overlaid on the sensor SS as performed in the present embodiment, the pixel opening OP3 of the sub-pixel SP3 needs to be made small. In this regard, the influence of the size of the blue sub-pixel SP3 on the display quality is smaller than the influence of the sizes of the red and green sub-pixels SP1 and SP2 on the display quality.

In the example of FIG. 3, the sensors SS1, SS2, and SS3 are distributed in the display area DA such that the same type of sensors of the three types of sensors SS1, SS2, and SS3 are not contiguous in either the first direction X or the second direction Y. With this configuration, the unevenness of the surface of the object can be detected with high accuracy regardless of the variation in the colors on the surface of the object.

In addition to the above advantages, various suitable advantages can be obtained from the present embodiment. Moreover, the configuration disclosed in the present embodiment can be transformed in various aspects.

Figure 9:
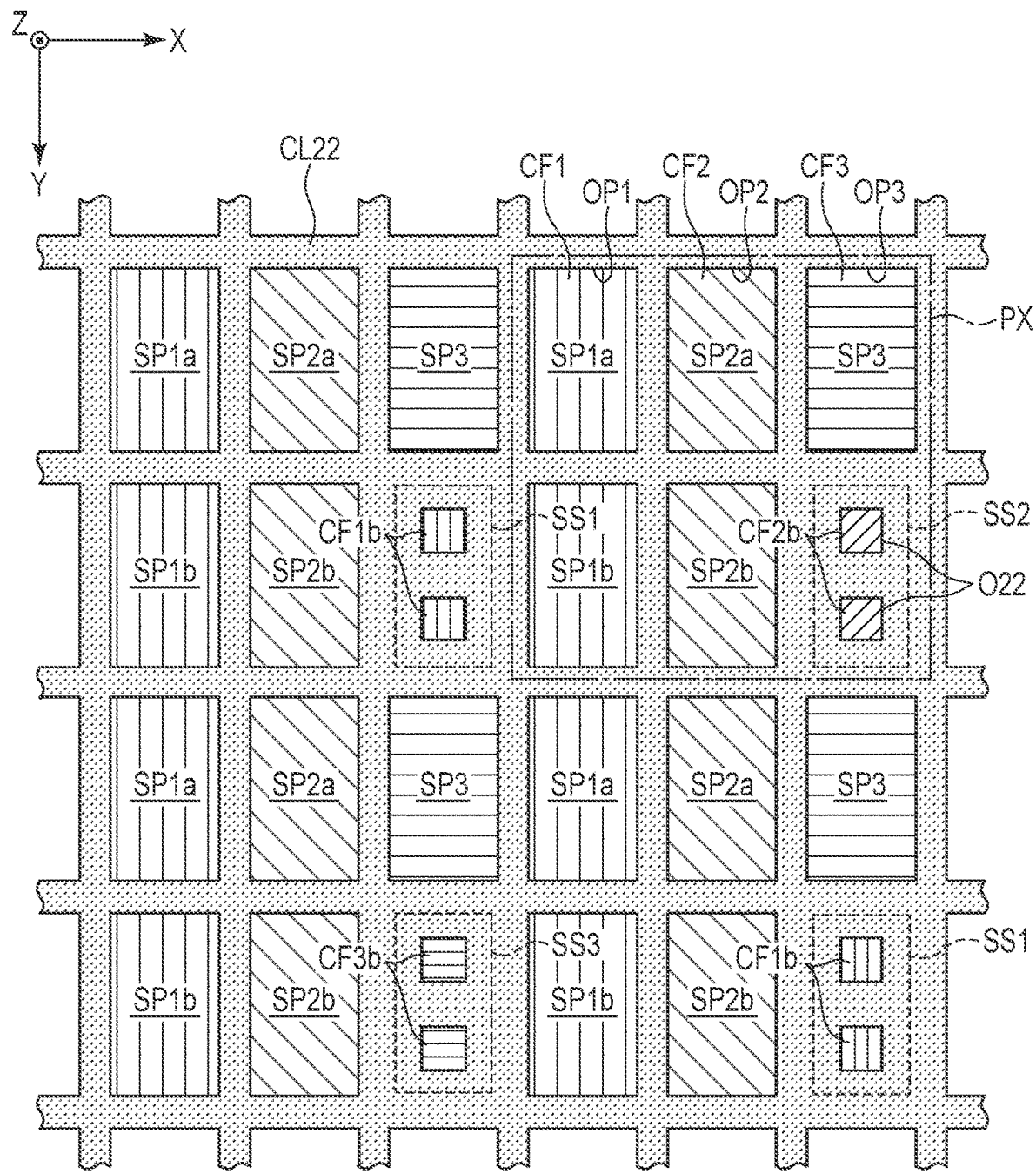
FIG. 9 is a schematic plan view showing another example of the layout of the pixels according to the first embodiment.

FIG. 9 is a schematic plan view showing the other example of layout of the pixel PX. In the example of FIG. 9, the pixel PX comprises two sub-pixels SP1a and SP1b aligned in the second direction Y, two sub-pixels SP2a and SP2b aligned in the second direction Y, and one sub-pixel SP3. The sub-pixels SP1a, SP2a, and SP3 are aligned in the first direction X. The sub-pixels SP1b and SP2b and the sensors SS (SS1, SS2, and SS3) are aligned in the first direction X. In addition, in the example of FIG. 9, the openings O22 have a rectangular shape. The openings O22 may have a circular shape, similarly to the example of FIG. 3. In such a layout, too, the same advantages as those of the above-described embodiment can be obtained.

Second Embodiment

Figure 10:
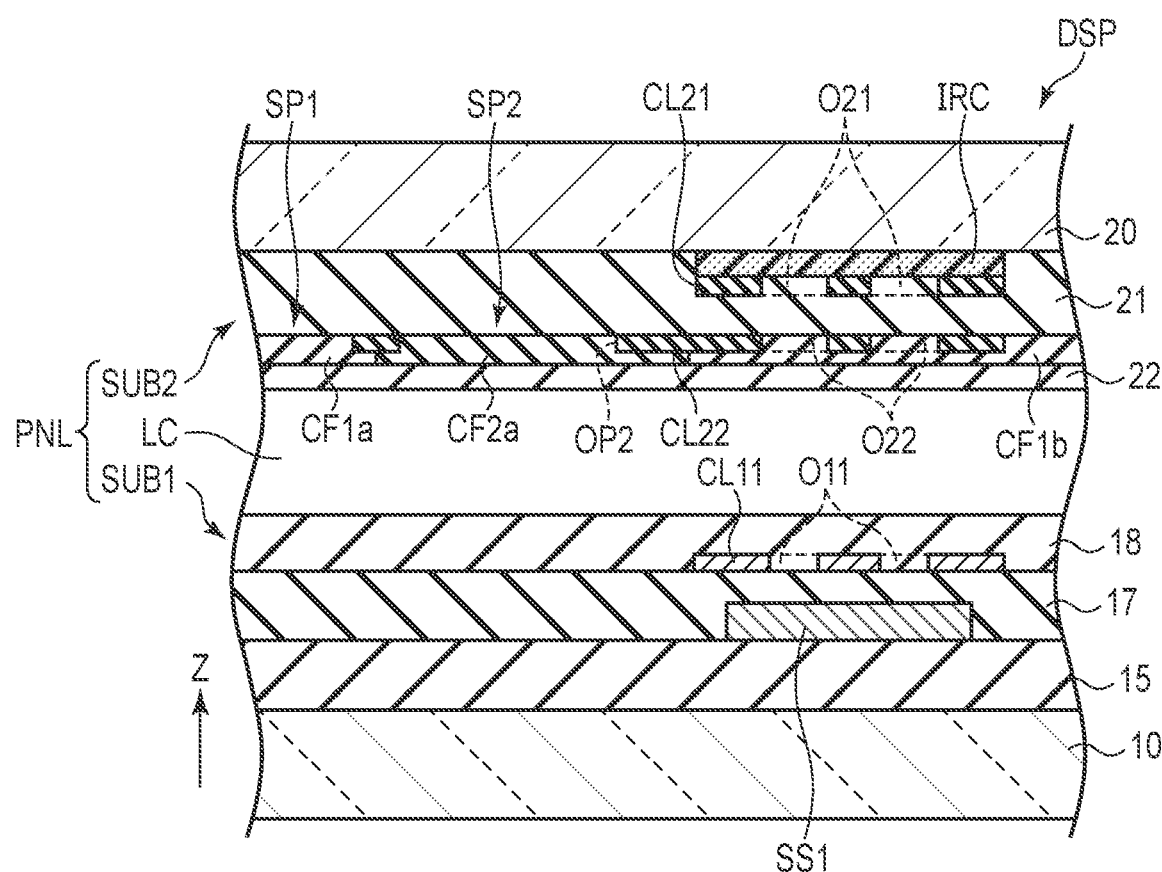
FIG. 10 is a schematic cross-sectional view showing a display device according to a second embodiment.

FIG. 10 is a schematic cross-sectional view showing a display device DSP according to a second embodiment. The cross-sectional structure of a display panel PNL including sub-pixels SP1 and SP2 and a sensor SS1 is shown similarly to FIG. 5. The same configuration as that of the first embodiment can be applied for the configuration not specifically mentioned in the present embodiment.

The display panel PNL shown in FIG. 10 is different from the display panel PNL shown in FIG. 5 in that an infrared cut layer IRC is disposed between a second base material 20 and a collimating layer CL21. For example, the infrared cut layer IRC is formed of a material having a lower transmittance of infrared rays (a material having a higher absorption index or reflectance of infrared rays) than color filters CF1a, CF2a, CF3a, CF1b, CF2b, and CF3b. The infrared cut layer IRC may be a bandpass filter using a dielectric multilayer film including a plurality of dielectrics having different refractive indexes.

The infrared cut layer IRC is overlaid on openings O11, O21, and O23 and the sensor SS1. The infrared cut layer IRC is not overlaid on sub-pixels SP1 and SP2. Although not shown in the cross-section of FIG. 10, the infrared cut layer IRC is not overlaid on a sub-pixel SP3 either.

The infrared cut layer IRC is also disposed for sensors SS2 and SS3, similarly to the sensor SS1. As another example, the infrared cut layer IRC may be disposed for only one or two of the sensors SS1, SS2, and SS3. In addition, when the color filter CF2b is formed of a material having a low transmittance of infrared rays as described above, the infrared cut layer IRC may not be provided for the sensor SS2.

With the structure of the present embodiment, infrared rays can be removed from the light incident on the sensors SS (SS1, SS2, and SS3), and noise caused by the infrared rays can be suppressed from mixing into the detection signals of the sensors SS.

Third Embodiment

Figure 11:
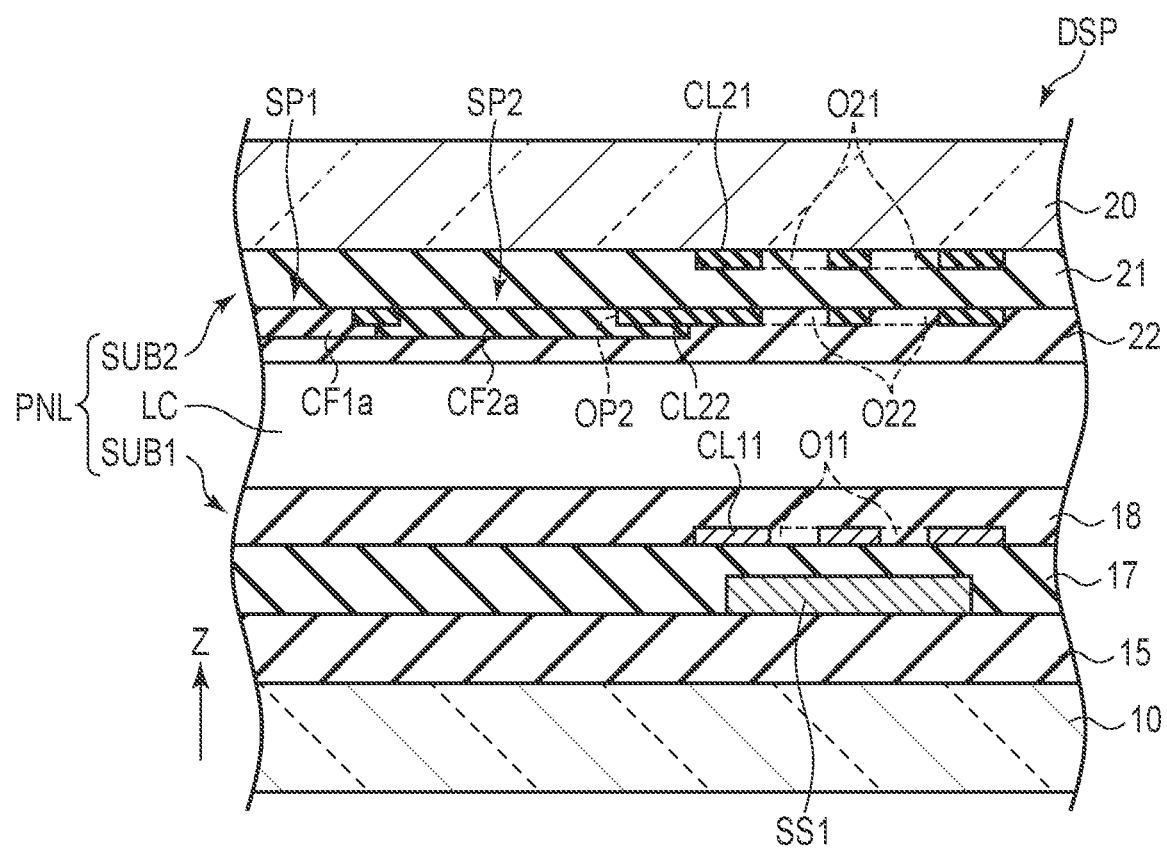
FIG. 11 is a schematic cross-sectional view showing a display device according to a third embodiment.

FIG. 11 is a schematic cross-sectional view showing a display device DSP according to a third embodiment. The cross-sectional structure of a display panel PNL including sub-pixels SP1 and SP2 and a sensor SS1 is shown similarly to FIG. 5. The same configuration as that of the first embodiment or the second embodiment can be applied for the configuration not specifically mentioned in the present embodiment.

The display panel PNL shown in FIG. 11 is different from the display panel PNL shown in FIG. 5 in that a color filter overlaid on a sensor SS1 is not disposed. Although not shown in the cross-section of FIG. 11, color filters overlaid on the sensors SS2 and SS3 are not disposed either.

Figure 12:
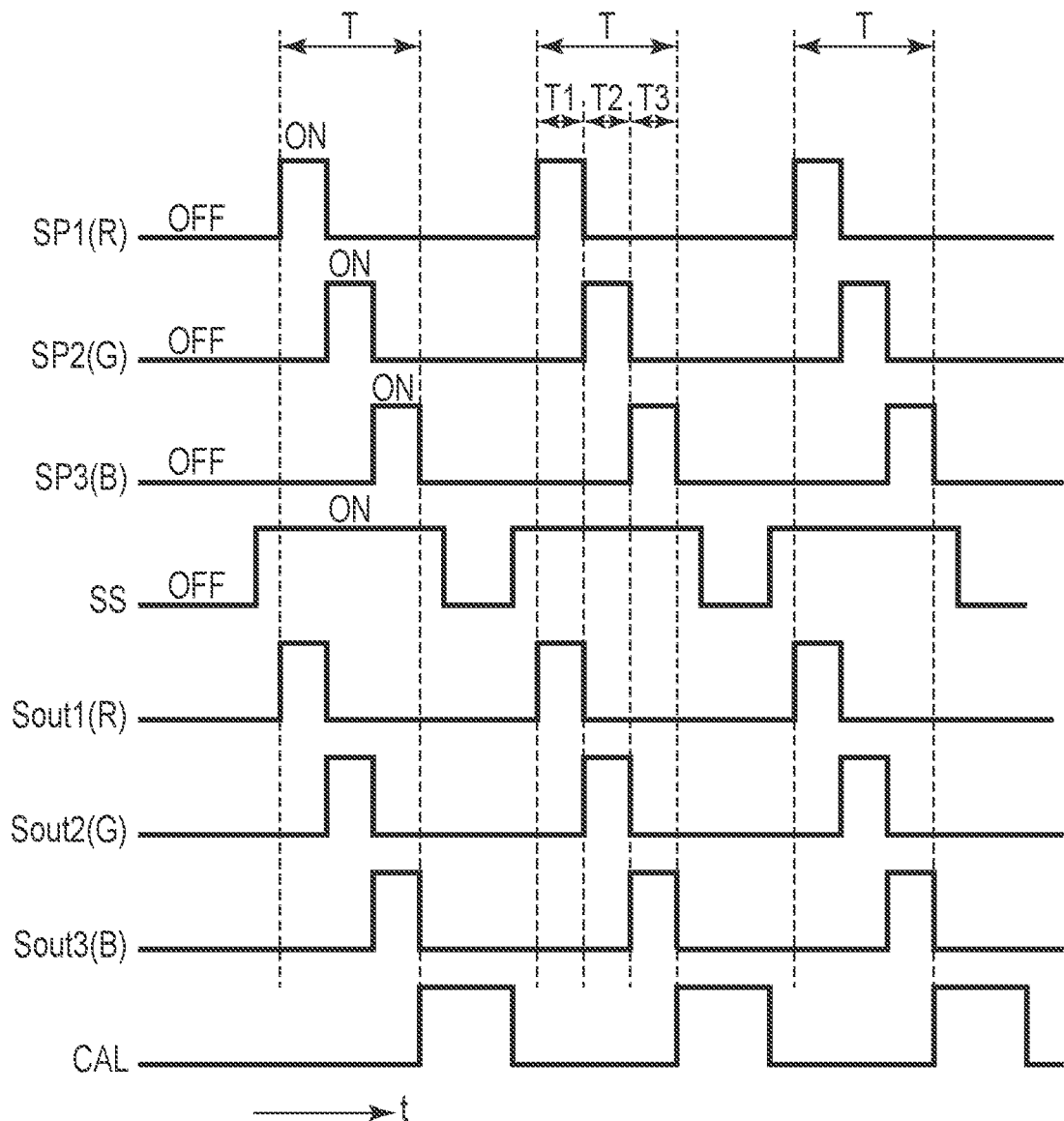
FIG. 12 is a timing chart showing an example of a detection operation according to the third embodiment.

FIG. 12 is a timing chart showing an example of a detection operation according to the present embodiment. In the example of this chart, a detection period T includes a first period T1, a second period T2 following the first period T1, and a third period T3 following the second period T2. A driver 2 turns on a sub-pixel SP1 of each pixel PX in the first period T1, turns on a sub-pixel SP2 of each pixel PX in the second period T2, and turns on a sub-pixel SP3 of each pixel PX in the third period T3.

In addition, the driver 2 acquires a detection signal Sout1 of the sensor SS1 in the first period T1, acquires a detection signal Sout2 of the sensor SS2 in the second period T2, and acquires a detection signal Sout3 of the sensor SS3 in the third period T3.

After the detection period T, the controller CT executes various calculations (CAL), based on the detection signals Sout1, Sout2, and Sout3, similarly to the first embodiment.

In the first period T1, an object is irradiated with red light emitted from the sub-pixel SP1. The detection signal Sout1 therefore corresponds to red reflected light. Similarly, the object is irradiated with green light emitted from the sub-pixel SP2 is irradiated to the object, in the second period T2, such the detection signal Sout2 corresponds to the green reflected light, and the objected is irradiated with blue light emitted from the sub-pixel SP3, in the third period T3, such the detection signal Sout3 corresponds to the blue reflected light. Based on these detection signals Sout1, Sout2, and Sout3, it can be discriminated whether the object is a user's finger or a simulated object, similarly to the first embodiment.

The configuration disclosed in the present embodiment can be transformed in various aspects.

Figure 13:
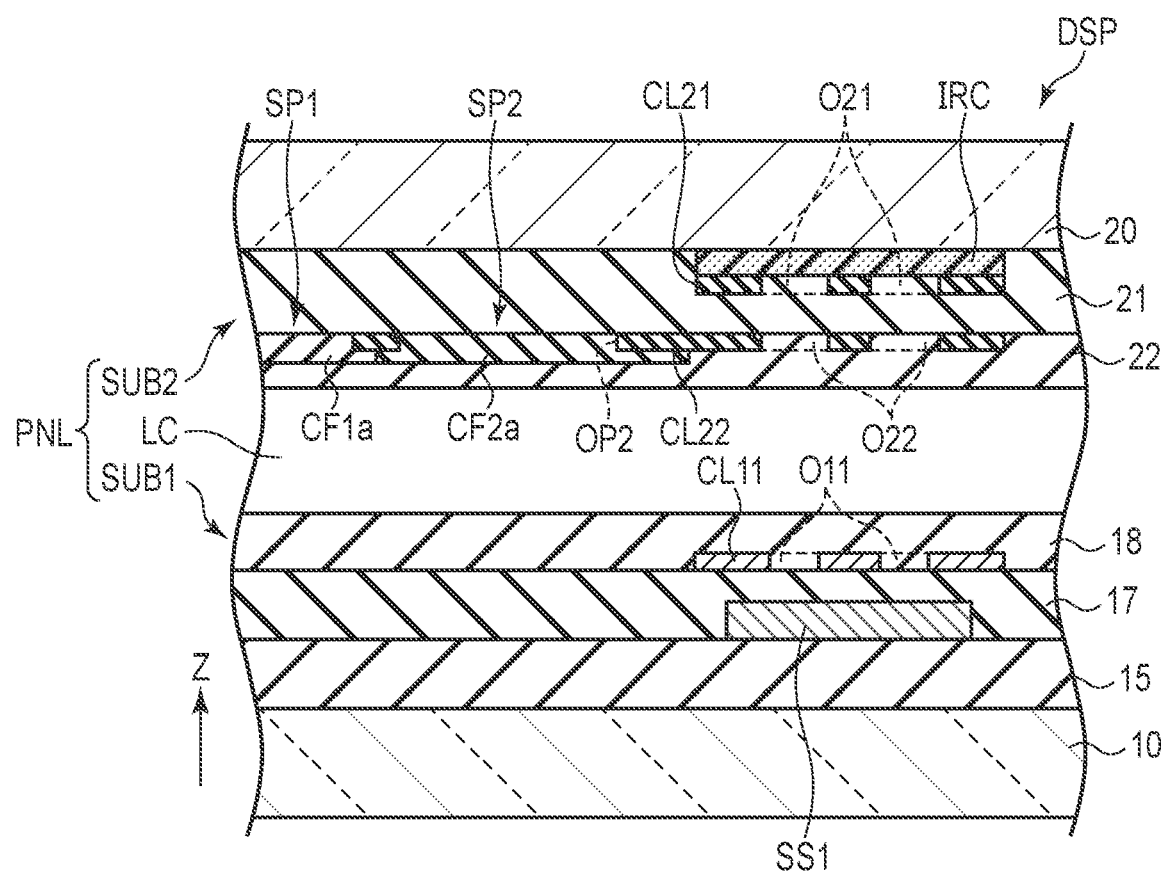
FIG. 13 is a schematic cross-sectional view showing another structure applicable to the display device according to the third embodiment.

FIG. 13 is a schematic cross-sectional view showing another structure applicable to the display device DSP according to the present embodiment. Similarly to the example of FIG. 10, an infrared cut layer IRC is disposed between a second base material 20 and a collimating layer CL21. The infrared cut layer IRC is overlaid on openings O11, O21, and O23 and the sensor SS1. The infrared cut layer IRC is also disposed for each of the sensors SS2 and SS3.

Figure 14:
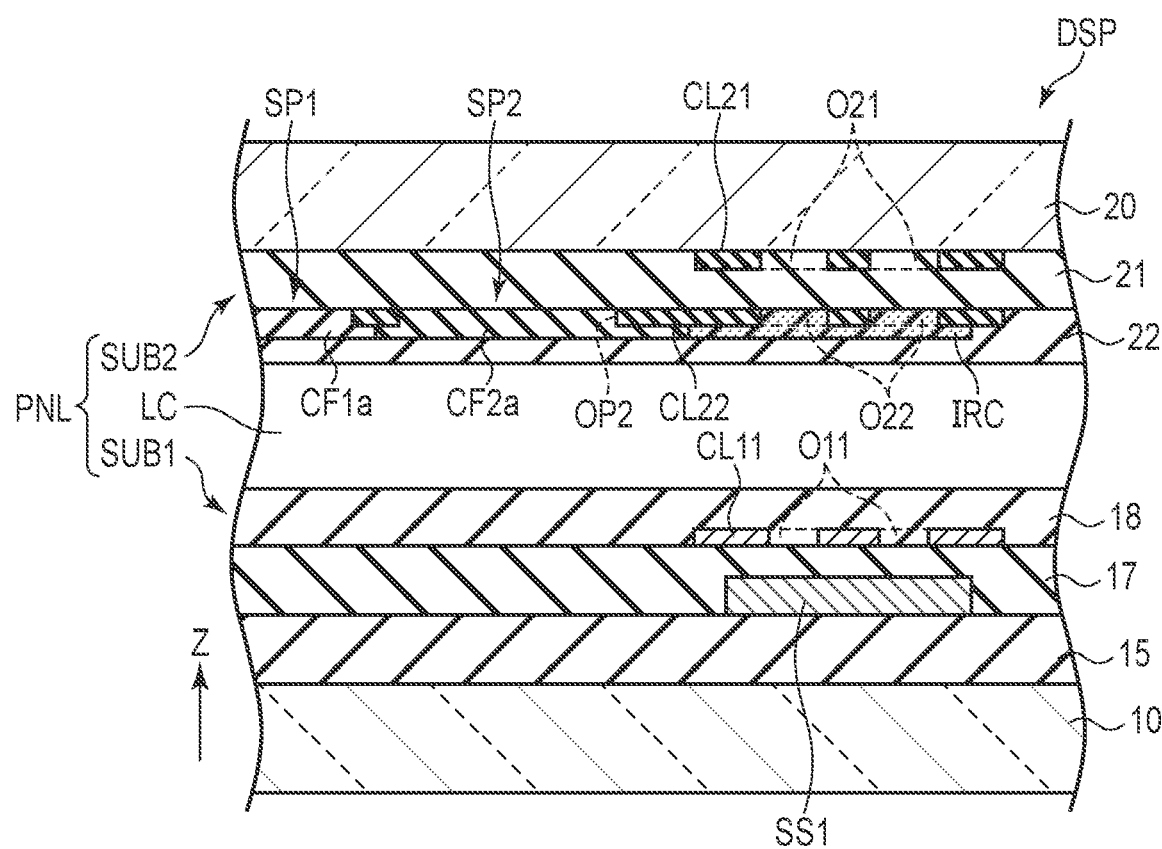
FIG. 14 is a schematic cross-sectional view showing a yet another structure applicable to the display device according to the third embodiment.

FIG. 14 is a schematic cross-sectional view showing yet another structure applicable to the display device DSP according to the present embodiment. In the example of this figure, the infrared cut layer IRC is disposed between a collimating layer CL22 and a liquid crystal layer LC. More specifically, the infrared cut layer IRC is located between the collimating layer CL22 and the overcoat layer 22.

The infrared cut layer IRC is overlaid on the openings O11, O21, and O23 and the sensor SS1, and fills an opening O22. The infrared cut layer IRC is also disposed for each of the sensors SS2 and SS3.

With these configurations as shown in FIG. 13 and FIG. 14, infrared rays can be removed from the light incident on the sensors SS1, SS2, and SS3, and noise caused by the infrared rays can be suppressed from being mixed into the detection signals.

In the first to third embodiments described above, red, green, and blue colors are examples of the first, second, and third colors, respectively. The sub-pixels SP1, SP2, and SP3 are examples of the first sub-pixel, the second sub-pixel, and the third sub-pixel, respectively. The sensors SS1, SS2, and SS3 are examples of the first sensor, the second sensor, and the third sensor, respectively. The openings O11, O21, and O23 overlaid on the sensor SS1 are examples of the first openings, the openings O11, O21, and O23 overlaid on the sensor SS2 are examples of the second openings, and the openings O11, O21, and O23 overlaid on the sensor SS3 are examples of the third openings. The color filters CF1b, CF2b, and CF3b are examples of the first color filter, the second color filter, and the third color filter, respectively. The color filter CF1a is an example of the fourth color filter. The detection signals Sout1, Sout2, and Sout3 are examples of the first detection signal, the second detection signal, and the third detection signal, respectively.

All of the display devices that can be implemented by a person of ordinary skill in the art through arbitrary design changes to the display devices described above as embodiments of the present invention come within the scope of the present invention as long as they are in keeping with the spirit of the present invention.

Various types of the modified examples are easily conceivable within the category of the ideas of the present invention by a person of ordinary skill in the art and the modified examples are also considered to fall within the scope of the present invention. For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:
1. A display device comprising:

a first substrate comprising a first sensor, a second sensor, a third sensor, and a first collimating layer disposed in a display area including a pixel;
a second substrate comprising a first color filter of a first color, a second color filter of a second color, a third color filter of a third color, a second collimating layer, and a third collimating layer; and
a liquid crystal layer between the first substrate and the second substrate; wherein
the first collimating layer is located between the first to third sensors and the liquid crystal layer in a thickness direction,
the first to third color filters and the third collimating layer are located between the first collimating layer and the second collimating layer in the thickness direction,
the first collimating layer includes a first opening overlapping the first color filter, a second opening overlapping the second color filter, and a third opening overlapping the third color filter,
the second collimating layer includes a fourth opening overlapping the first color filter, a fifth opening overlapping the second color filter, and a sixth opening overlapping the third color filter,
the third collimating layer includes a seventh opening overlapping the first color filter, an eighth opening overlapping the second color filter, and a ninth opening overlapping the third color filter,
the first opening, the fourth opening, and the seventh opening are arranged in the thickness direction,
the second opening, the fifth opening, and the eighth opening are arranged in the thickness direction,
the third opening, the sixth opening, and the ninth opening are arranged in the thickness direction,
the first opening is smaller than both of the fourth opening and the seventh opening,
the second opening is smaller than both of the fifth opening and the eighth opening,
the third opening is smaller than both of the sixth opening and the ninth opening,
the first sensor is configured to output a first detection signal corresponding to light made incident through the first opening, the fourth opening, the seventh opening, and the first color filter;
the second sensor is configured to output a second detection signal corresponding to light made incident through the second opening, the fifth opening, the eighth opening, and the second color filter; and
the third sensor is configured to output a third detection signal corresponding to light made incident through the third opening, the sixth opening, the ninth opening, and the third color filter.

2. The display device of claim 1, further comprising:
a fourth color filter of the first color overlaid on the pixel, wherein
the first color filter is connected to the fourth color filter.

3. The display device of claim 1, further comprising:
an infrared cut layer overlaid on at least one of the first opening, the second opening, and the third opening.

4. The display device of claim 1, further comprising:
a pixel electrode formed of a transparent conductive material,
wherein
at least one of the first sensor, the second sensor, and the third sensor is overlaid on the pixel electrode.

5. The display device of claim 4, wherein
at least one of the first opening, the second opening, and the third opening is overlaid on the pixel electrode.

6. The display device of claim 1, wherein
the display area includes a plurality of first sub-pixels of the first color, a plurality of second sub-pixels of the second color, and a plurality of third sub-pixels of the third color, and
the third collimating layer includes a plurality of first pixel openings provided in the plurality of first sub-pixels, respectively, a plurality of second pixel openings provided in the plurality of second sub-pixels, respectively, and a plurality of third pixel openings provided in the plurality of third sub-pixels, respectively.

7. The display device of claim 6, wherein
each of the first opening, the second opening, and the third opening is disposed between two adjacent openings of the plurality of third pixel openings.

8. The display device of claim 7, further comprising:
a fourth color filter overlaid on the plurality of first pixel openings;
a fifth color filter overlaid on the plurality of second pixel openings; and
a sixth color filter overlaid on the plurality of third pixel openings,
wherein
the fourth color filter, the fifth color filter, and the sixth color filter are arranged in a first direction,
the fourth color filter and the fifth color filter are formed in a straight line in a second direction intersecting the first direction, and
the sixth color filter is formed intermittently in the second direction.

9. The display device of claim 1, wherein
the first sensor, the second sensor, and the third sensor output the first detection signal, the second detection signal, and the third detection signal, respectively, in accordance with light emitted from the pixel and reflected on an object.

10. The display device of claim 1, further comprising:
a controller detecting unevenness on an object, based on the first detection signal, the second detection signal, and the third detection signal.

11. The display device of claim 10, wherein
the controller discriminates whether the object is a living body or a simulated body, based on a chronological change of each of the first detection signal, the second detection signal, and the third signal.

12. A display device comprising:
a first substrate comprising a sensor and a first collimating layer disposed in a display area including a pixel;
a second substrate comprising a second collimating layer and a third collimating layer;
a liquid crystal layer between the first substrate and the second substrate; and
a driver controlling the pixel and the sensor,
wherein
the first collimating layer is located between the sensor and the liquid crystal layer in a thickness direction,
the third collimating layer is located between the first collimating layer and the second collimating layer in the thickness direction,
the first collimating layer includes a first opening,
the second collimating layer includes a second opening,
the third collimating layer includes a third opening,
the first opening, the second opening, and the third opening are arranged in the thickness direction,
the first opening is smaller than both of the second opening and the third opening, the sensor is configured to output a detection signal corresponding to reflected light emitted from the pixel, reflected on an object and incident on the sensor through the first opening, the second opening, and the third opening, the pixel includes a first sub-pixel emitting light of a first color, a second sub-pixel emitting light of a second color, and a third sub-pixel emitting light of a third color, the driver is configured to turn on the first sub-pixel during a first period and causing the sensor to output a first detection signal corresponding to reflected light of the light of the first color emitted from the first sub-pixel, to turn on the second sub-pixel during a second period and causing the sensor to output a second detection signal corresponding to reflected light of the light of the second color emitted from the second sub-pixel, and to turn on the third sub-pixel during a third period and causing the sensor to output a third detection signal corresponding to reflected light of the light of the third color emitted from the third sub-pixel.

13. The display device of claim 12, further comprising: an infrared cut layer overlaid on the sensor and not overlaid on the first sub-pixel, the second sub-pixel, and the third sub-pixel.

14. The display device of claim 13, wherein: the second substrate comprises the infrared cut layer.

15. The display device of claim 14, wherein the second substrate further comprises a base material; and the infrared cut layer is disposed between the base material and the second collimating layer, or between the second collimating layer and the liquid crystal layer.

16. The display device of claim 12, further comprising: a pixel electrode formed of a transparent conductive material, wherein at least a part of the sensor is overlaid on the pixel electrode.

17. The display device of claim 16, wherein at least a part of the first opening, the second opening, and the third opening is overlaid on the pixel electrode.

18. The display device of claim 12, further comprising: a controller detecting unevenness on an object, based on the first detection signal, the second detection signal, and the third detection signal.

19. The display device of claim 18, wherein the controller discriminates whether the object is a living body or a simulated body, based on a chronological change of each of the first detection signal, the second detection signal, and the third signal.

* * * * *